(12) United States Patent (10) Patent No.: US 7,283,431 B2
Woo (45) Date of Patent: Oct. 16, 2007

(54) CHARGER FOR OPTICAL RECORDING MEDIA

(75) Inventor: Jisung Woo, Shatin (HK)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/540,408

(22) PCT Filed: Nov. 24, 2003

(86) PCT No.: PCT/EP03/13173

§ 371 (c)(1),
(2), (4) Date: Apr. 11, 2006

(87) PCT Pub. No.: WO2004/061842

PCT Pub. Date: Jul. 22, 2004

(65) Prior Publication Data

US 2006/0242656 A1 Oct. 26, 2006

(30) Foreign Application Priority Data

Jan. 6, 2003 (EP) .................................. 03290022

(51) Int. Cl.
*G11B 17/22* (2006.01)
*G11B 17/04* (2006.01)
(52) U.S. Cl. .................................................. 369/30.78
(58) Field of Classification Search ............. 369/30.76, 369/30.77, 30.78, 30.83, 30.85, 178.01; 360/98.01, 360/99.02, 99.03, 99.06, 99.07; 720/611
See application file for complete search history.

(56) References Cited

U.S. PATENT DOCUMENTS

| 6,081,486 | A  | * | 6/2000 | Fujisawa ................. | 369/30.85 |
| 6,337,843 | B2 | * | 1/2002 | Yoshida et al. ........ | 369/178.01 |
| 6,341,119 | B1 | * | 1/2002 | Ezawa et al. ............ | 369/30.83 |
| 6,459,674 | B1 | * | 10/2002 | Matsumoto et al. ........ | 720/611 |

FOREIGN PATENT DOCUMENTS

EP 0905686 3/1999
EP 1164584 12/2001

OTHER PUBLICATIONS

Search Report Dated Feb. 11, 2004.

\* cited by examiner

*Primary Examiner*—Tianjie Chen
(74) *Attorney, Agent, or Firm*—Joseph J. Laks; Harvey D. Fried; Patricia Verlangieri

(57) ABSTRACT

The present invention relates to an elevator type changer for optical recording media including a moveable drawer supporting a number of trays arranged one above the other, each tray capable of holding an optical recording medium, which allows access to all trays at the same time. According to the invention, a changer for optical recording media including a moveable drawer supporting a number of trays arranged one above the other, each tray being capable of holding an optical recording medium, the trays being mounted such that they are pivotable about a horizontal axis of the drawer, is characterized in that the trays are pivoted about the horizontal axis by a rotating movement of a rotation cam connected to the drawer.

12 Claims, 6 Drawing Sheets

CHARGER FOR OPTICAL RECORDING MEDIA

Figure 1:
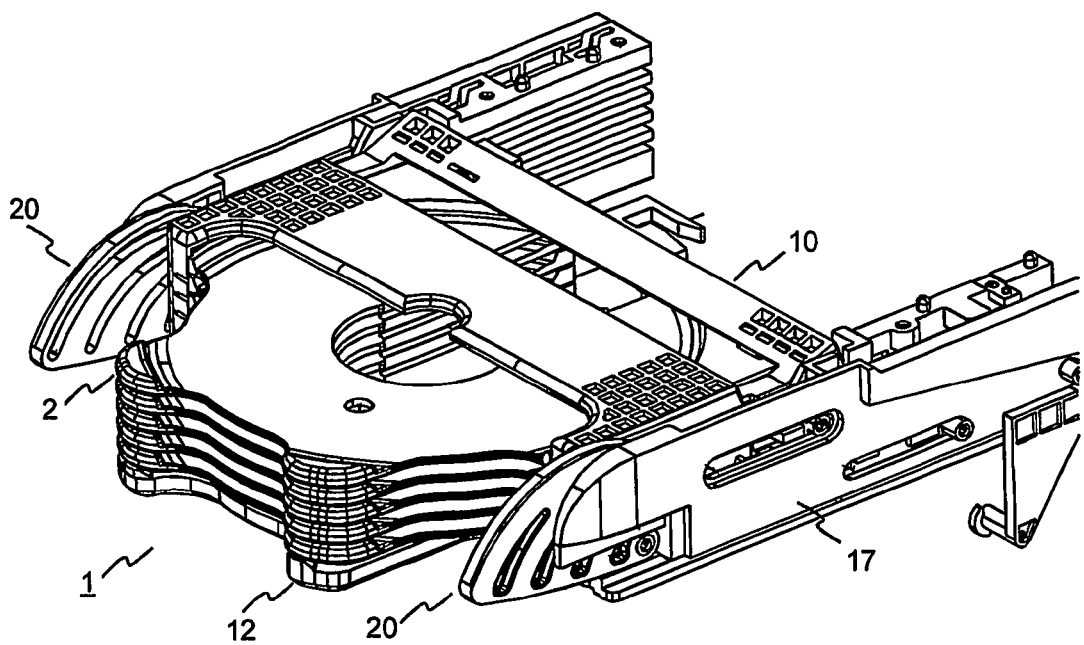

This application claims the benefit, under 35 U.S.C. § 365 of International Application PCT/EP03/13173, filed Nov. 24, 2003, which was published in accordance with PCT Article 21(2) on Jul. 22, 2004 in English and which claims the benefit of European patent application No. 03290022.7, filed Jan. 6, 2003.

The present invention relates to an elevator type changer for optical recording media including a moveable drawer supporting a number of trays arranged one above the other, each tray capable of holding an optical recording medium, which allows access to all trays at the same time.

Such changers for optical recording media such as CD, DVD, or the like, generally consist of a main chassis including the drive elements and the electronic modules for processing the signals for the playback and/or recording operation. Within the chassis a moveable drawer is mounted. The drawer normally resides in the chassis and can be pulled out of the chassis for replacing the optical recording media. The drawer includes a number of trays arranged one above the other, each tray being capable of holding an optical recording medium. For one type of changer, the trays are provided with openings which allow the optical recording medium within the tray to be gripped and pulled out of the tray for the playback or recording operation. For another type of changer, the trays can be moved from a storage position within the drawer to an operating position. The trays are provided with an opening which allows to access the optical recording medium within the tray with an optical pickup unit. For both types of disk changers, if a user wants to replace the optical recording media contained in the trays, only one tray can be accessed at a time, which makes the changing of the optical recording media a time consuming and cumbersome task.

In the European Patent Application EP 1 164 584 a changer for CD and/or DVD disks including a drawer slidably mounted within a chassis of the changer and supporting a number of trays arranged one above the other and each holding a disk therein, wherein the trays are each mounted at one end via a hinge at the drawer in such a way that they are pivotable about a horizontal axis of the chassis, is proposed. A sidewall of the chassis is provided with a number of parallel extending slots, each having a substantially horizontal section and a subsequent downwardly inclined section. The slots cooperate with corresponding pins of the trays in such a way that, if the drawer is pulled away from the chassis, the pins of the trays are moved downwardly by the downwardly inclined section of the slots, so that the trays, which are rotatably connected to the sidewalls of the chassis with a further pin serving as an axis of rotation and cooperating with a corresponding hole within the sidewalls, are pivoted upwardly and spread. In this way all trays can be accessed at the same time.

It is an object of the invention to improve a known disk changer.

According to the invention, a changer for optical recording media includes a moveable drawer supporting a number of trays arranged one above the other, each tray being capable of holding an optical recording medium, the trays being mounted such that they are pivotable about a horizontal axis, the trays being pivoted about the horizontal axis by a rotating movement of a rotation cam connected to the drawer. The horizontal axis of the pivoting movement of each tray is perpendicular to the direction of movement of the drawer when the drawer is pulled away from the chassis into the access position. Using a rotation cam connected to the drawer for the pivoting operation has the advantage that the axis of rotation of the trays can be located very closely to the end of the trays, contrary to the prior art, where at the end of the trays the pins cooperating with the slots of the sidewall for performing the pivoting operation are provided. The design according to the invention allows to reduce the distance between the trays, resulting in a more compact design. Furthermore, contrary to the prior art, the point of contact for the pivoting operation does not need to be close to the axis of rotation, which reduces the forces acting on this point of contact and makes the changer more reliable.

Advantageously a pair of rotation cams is provided, one at each side of the trays. This has the advantage that the force for pivoting the trays is applied symmetrically to both sides of the trays, thus reducing the force applied to each side of the trays and the risk of canting of the trays.

Favourably, the trays are mounted in guide rails mounted at a first end at the drawer via a first hinge and mounted at the rotation cam via a second hinge. In this way the pivoting operation is mainly performed with the guide rails carrying the trays, not with the trays themselves. The trays, therefore, are not fixed to the rotation cam or to the drawer and can be moved from the storage position to the operating position and vice versa. Contrary to the prior art, where during this movement the trays are guided by the pins used for the pivoting operation, according to the invention the trays are guided by a special, optimised guiding element for each guide rail. This makes the movement more reliable and prevents canting of the trays during the movement. The uppermost guide rails are favourably connected and formed by a single part.

Advantageously, the second hinge of the guide rails are located between the first hinges of the guide rails and the second end of the guide rails. By putting the second hinges close to the second end of the guide rails, the forces necessary for the pivoting operation, i.e. the forces acting on the second hinges, are minimized. This reduces the risk of breaking of the hinges and makes the changer more robust.

Favourably, the rotation cam is rotated by a cam driver connected to the rotation cam. This has the advantage that, since the rotation cam is rotatably connected to the drawer, the cam driver only needs to perform a linear movement for rotating the rotation cam. This linear movement is, for example, realised using the driving mechanism provided for pulling the trays from the storage position to the operating position. It is, of course, also possible to provide a dedicated drive for the cam driver or to rotate the rotation cam directly. In case of several rotation cams, several cam drivers are provided.

Advantageously, the cam driver moves linearly relative to the drawer. Since a mechanism for releasing the drawer from the chassis, i.e. for moving the drawer out of the chassis, has to be provided anyway, the pivoting operation can easily be realised by fixing the cam driver to the chassis and moving the drawer relative to the cam driver. In this way, no additional driving mechanism is necessary for the pivoting operation.

According to another aspect of the invention, a stopper is provided for preventing the slipping of an optical recording medium into the changer when the trays are spread. Though in their pivoted position the distance between the ends of the trays is very small, there is a chance that, when a user places a recording medium on one of the trays, the recording medium might slip through the gap between the tray and the respective upper tray into the changer. This risk of slipping is increased when the drawer can be pulled away from the chassis with a tray remaining in the operating position. In this case the user can replace the recording media contained in the trays while another recording medium is played back or recorded. However, since one tray remains in the operating position, there is an enlarged gap between the adjacent trays. In case a recording medium slips into the changer this recording medium has to be pulled out of the changer manually by the user. This is effectively prevented by providing a stopper.

Favourably, the stopper comprises a rotation bar rotatable from a retracted position to a stopping position. This makes it possible to use a single stopper, i.e. the rotation bar, for all trays. However, since the trays have to be moved from the storage position to the operating position, the rotation bar must not obstruct the movement of the trays. This is achieved by rotating the rotation bar into the retracted position.

Advantageously, a locking means is provided for securing the rotation bar in the stopping position and/or the retracted position. A securing of the rotation bar in the retracted position can be achieved, for example, by a plate spring. The spring prevents that due to vibrations or the like the rotation bar rotates from the retracted position to an intermediate position and interferes with the movement of the trays. In the stopping position the rotation bar is secured by a special locking means attached to the uppermost guide rail. Favourably, the special locking means only secures the rotation bar when the trays are in the pivoted state. The locking means ensures that even by force it is not possible to insert an optical recording medium into the changer.

Favourably, the rotation of the rotation bar from the retracted position to the stopping position and vice versa is controlled by a cam. The cam can, for example, be attached to a gear used for moving the drawer. In this way, the rotation of the rotation bar is connected to the movement of the drawer and, therefore, also to the pivoting operation. This has the advantage that on the one hand no additional driving mechanism for the rotation bar is needed and that on the other hand the different movements have a fixed relation. It is, of course, also possible to provide a dedicated driving mechanism for the rotation bar.

According to the invention, the rotating movement of the rotation cam, the linear movement of the cam driver, and/or the rotation of the rotation bar are implemented by electromechanical driving means. In this way, all movements can be performed automatically without the need for any manual intervention by the user. This makes the changer very comfortable to use.

Favourably, the trays are provided with means for securing the optical recording media in the trays if the changer is arranged vertically. The securing means ensure that optical recording media can be placed on the trays even if the trays are in a vertical position. The possibility to arrange the changer vertically, e.g. due to space limitations or other requirements, extends the possible range of application of the changer.

Advantageously, an apparatus for reading from and/or writing to optical recording media comprises a changer for optical recording media according to the invention. Such an apparatus is very comfortable to operate since it allows to replace all optical recording media contained in the trays at the same time without any time consuming and cumbersome operations.

Figure 2:
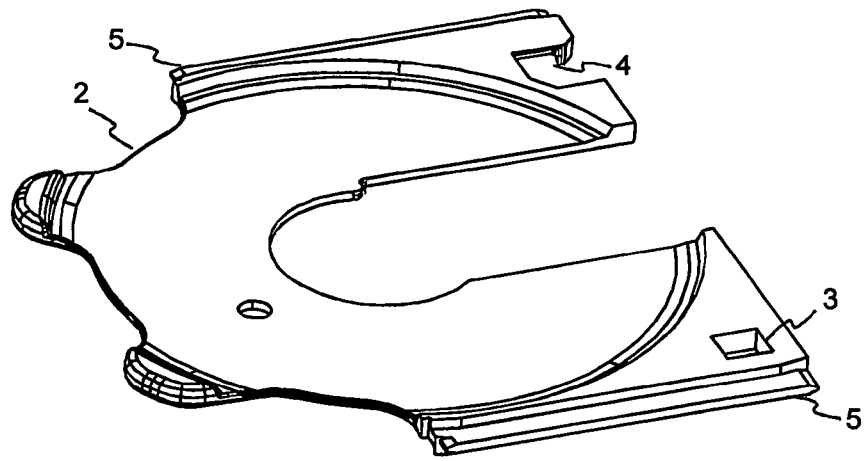
Figure 3:
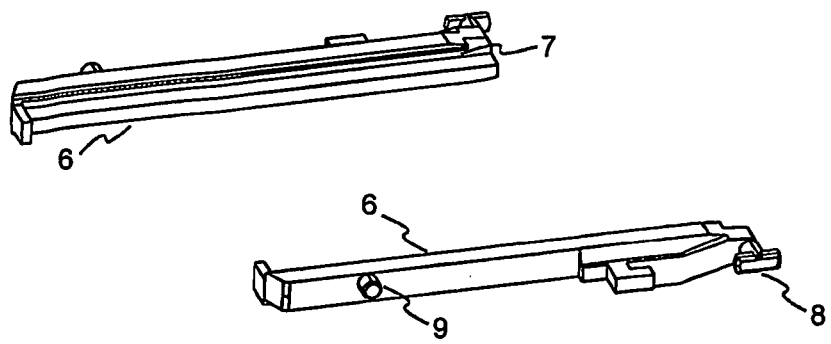
Figure 4:
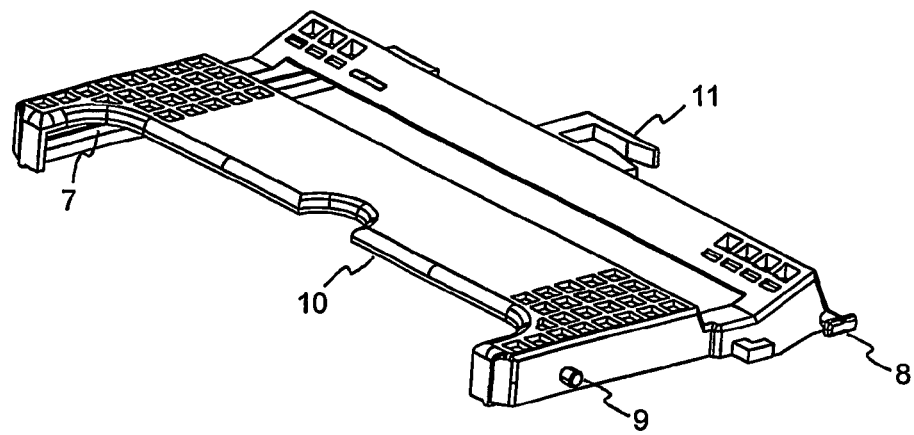
Figure 5:
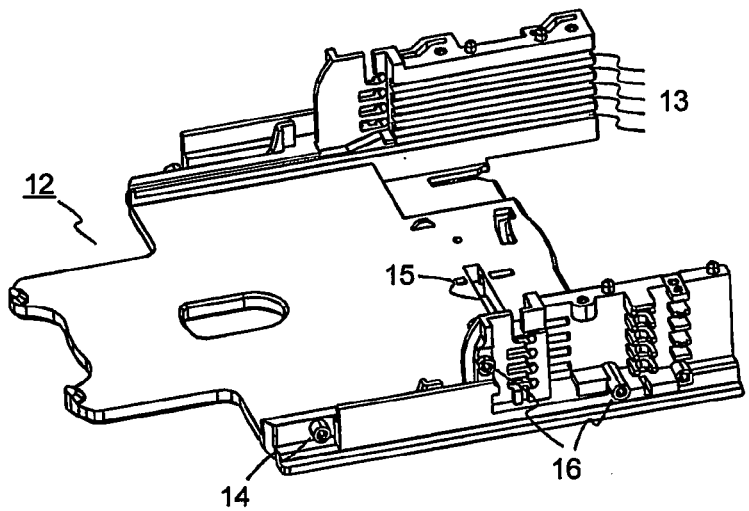
Figure 6:
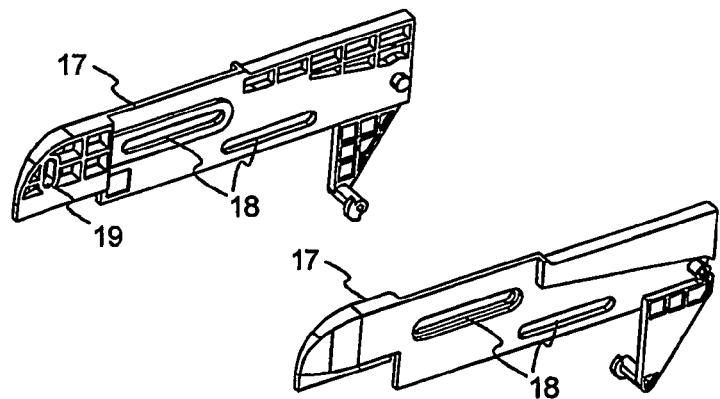
Figure 7:
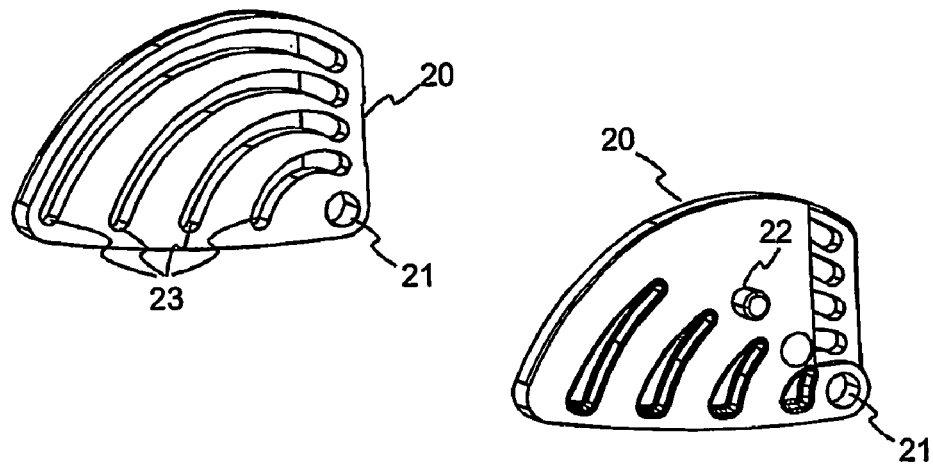
Figure 8:
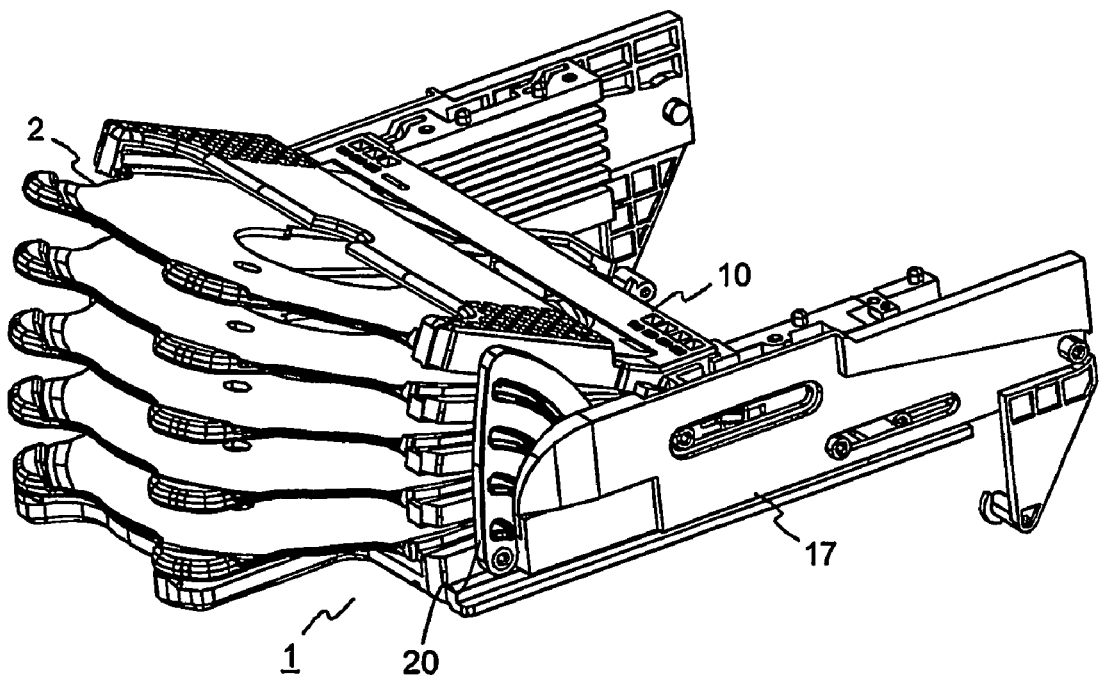
Figure 9:
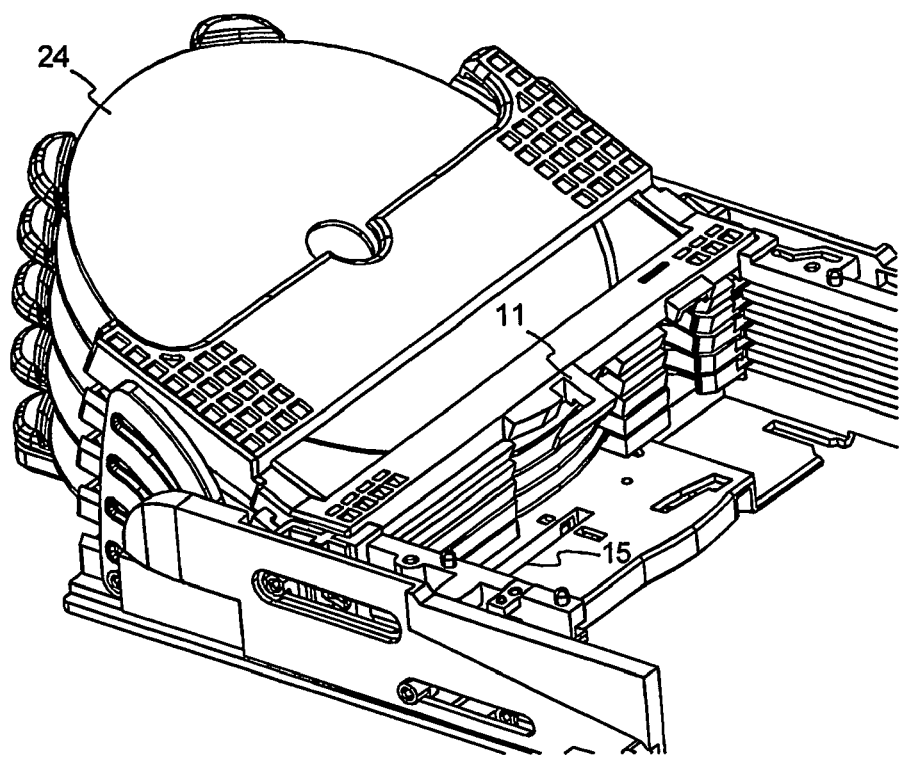
Figure 10:
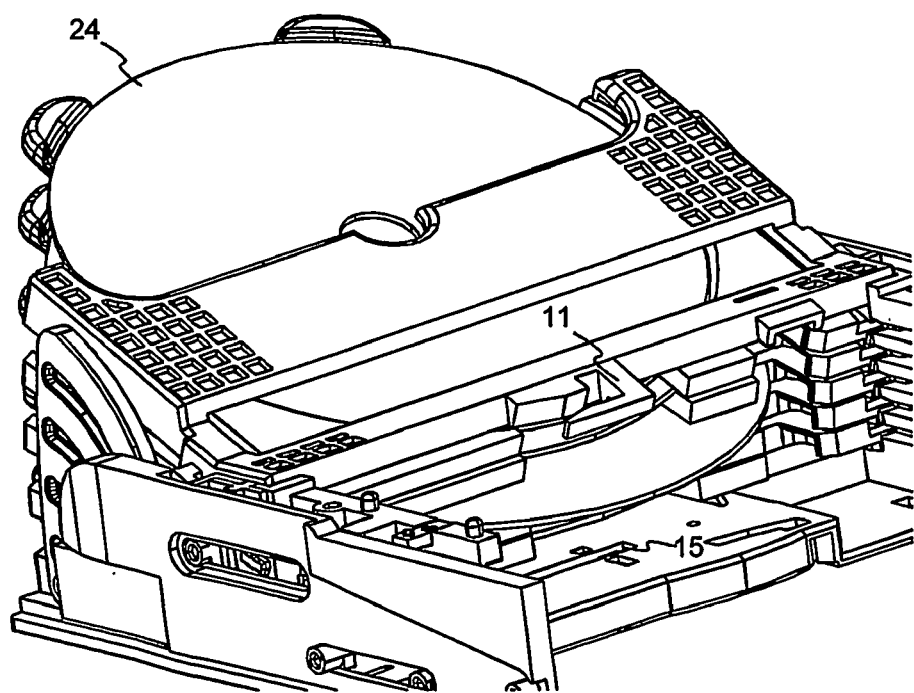
Figure 11:
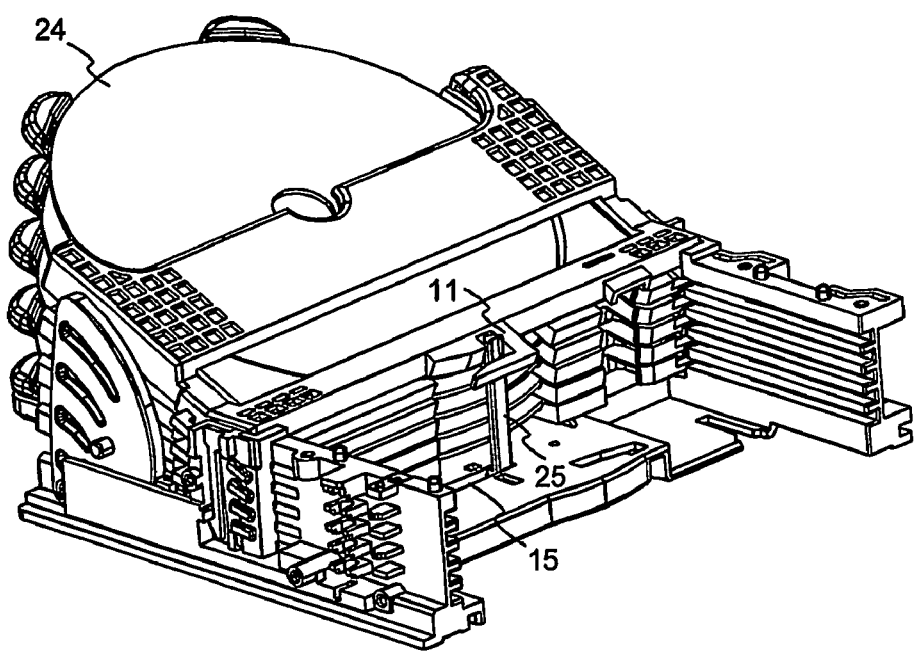
Figure 12:
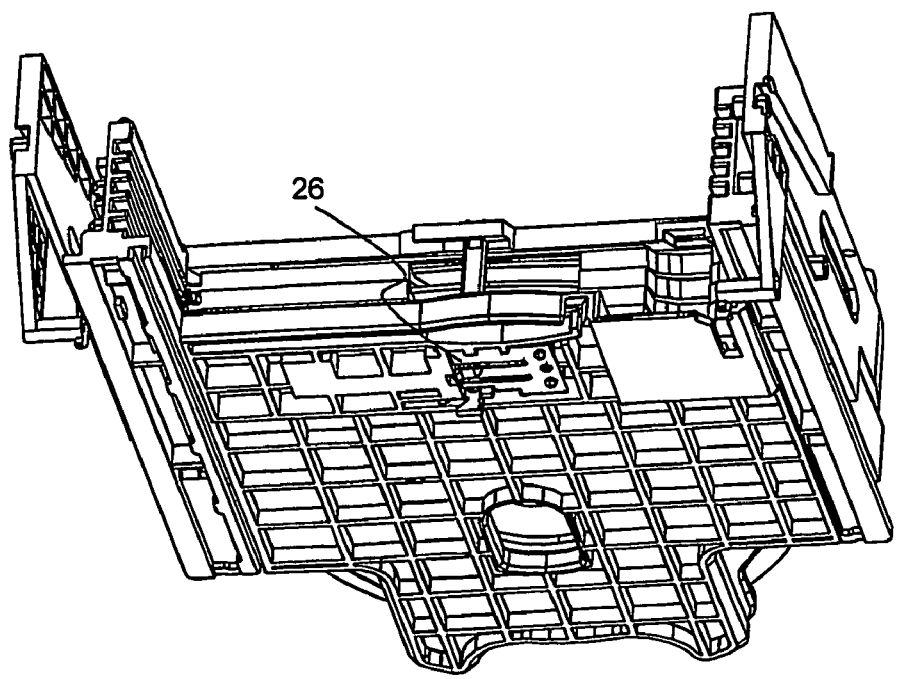
Figure 13:
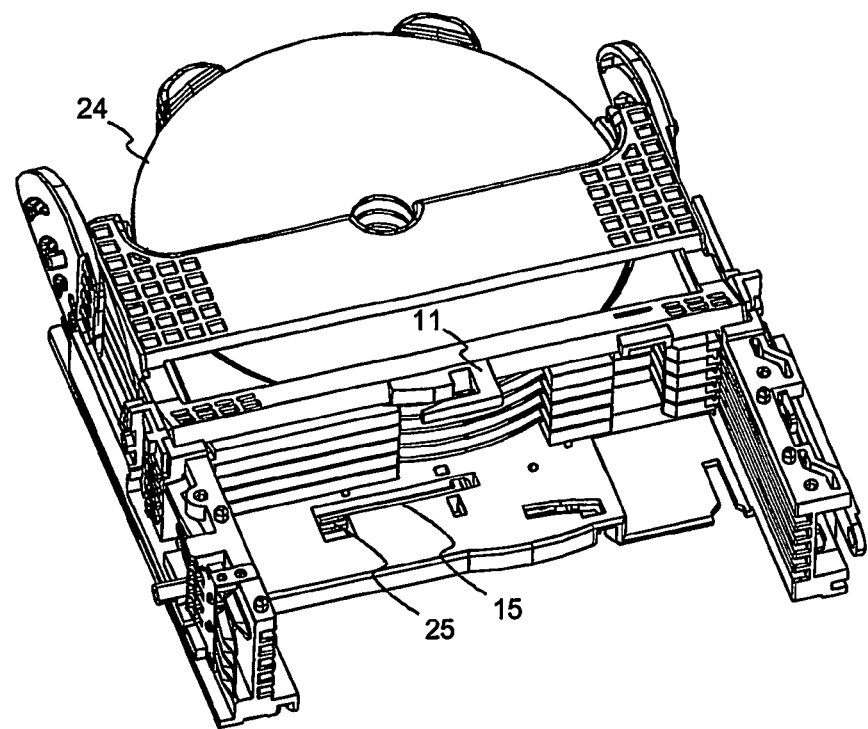
Figure 14:
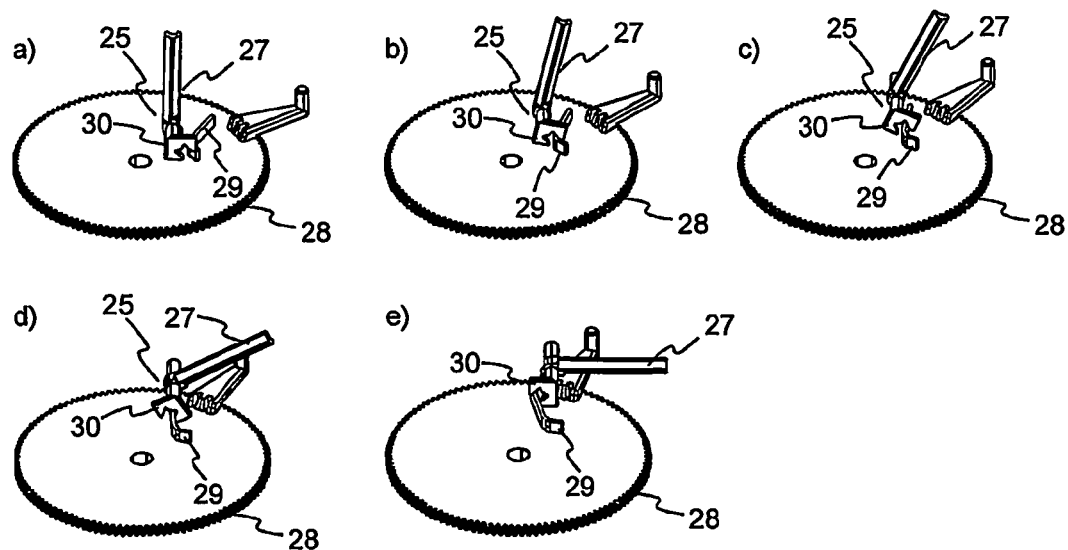

Exemplary embodiments of the invention are specified in the following description of advantageous configurations with reference to the figures. It is understood that the invention is not limited to these exemplary embodiments and that the specified features can also expediently be combined and/or modified without departing from the scope of the present invention. In the figures:

FIG. 1 shows a disk changer according to the invention with closely packed trays, FIG. 2 shows a tray for use with the disk changer according to the invention, FIG. 3 shows a pair of guide rails for the trays, FIG. 4 shows the top guide rail for the uppermost tray, FIG. 5 shows a drawer for the trays, FIG. 6 shows a pair of cam drivers for the pivoting mechanism, FIG. 7 shows a pair of rotation cams for the pivoting mechanism, FIG. 8 shows the disk changer according to the invention with pivoted trays, FIG. 9 shows the disk changer according to the invention with pivoted trays and loaded recording media, FIG. 10 shows the disk changer as in FIG. 9, with a recording medium having slipped into the disk changer, FIG. 11 shows a disk changer as in FIG. 9 having an additional disk stopper, FIG. 12 shows a bottom view of the disk stopper, FIG. 13 shows the disk changer as in FIG. 11 with closely packed trays and a retracted disk stopper, and FIG. 14 shows the mechanism for retracting the disk stopper.

In FIG. 1 a disk changer 1 according to the invention is shown. In this embodiment the disk changer 1 comprises a drawer 12 supporting five trays 2 for loading up to five optical recording media 24. However, a different number of trays 2 can also be used. Each of the four lower trays 2 is guided by a pair of guide rails 6 as shown in FIG. 3, while the uppermost tray 2 is guided by a top guide rail 10 shown in FIG. 4. The guide rails 6, 10, having guide grooves 7, and further guide grooves 13, as shown in FIG. 5, are used for guiding the trays 2 from a storage position to an operating position. In the storage position the user cannot access the optical recording media 24, which are held on the trays 2, since the trays 2 are closely packed. If the user wants to replace one or more optical recording media 24, the disk changer 1 moves the drawer 12 together with the trays 2 from the storage position to an access position. For this purpose the disk changer 1 comprises a pair of rotation cams 20 and a pair of cam drivers 17, which pivot the trays 2 and allow access to all trays 2 at the same time. The operation of the pivoting mechanism will be explained later on.

FIG. 2 shows a tray 2 for use in the disk changer 1. The tray 2 has two guiding elements 5 working together with the guide grooves 7 of the guide rails 6, 10 and the further guide grooves 13 for guiding the disk tray 2 from the storage position to the operating position. In addition, the tray 2 has an opening 3, which is used for securing the tray 2 in the playback position, and a recess 4 used for pulling the tray 2 from the storage position to the operating position. A recording medium 24 held on the tray 2 can be accessed by a pickup unit (not shown) through a further opening of the tray.

The guiding elements 5 are designed such that no canting occurs when the guiding elements 5 move from the guide grooves 7 of the guide rails 6, 10 to the further guide grooves 13 and vice versa if a correct alignment of the guide grooves 7, 13 within certain tolerances is ensured. Furthermore, the length of the guiding elements is chosen such that a pivoting of the trays 2 is only possible when the trays 2 are completely in their storage position. The design of the guiding elements 5 guarantees a more reliable guidance of the trays 2 than the design according to prior art using guiding pins.

The pair of guide rails 6 used for guiding the tray 2 from the storage position to the operating position and vice versa is shown in FIG. 3. Each guide rail 6 has a guide groove 7 accommodating the guiding element 5 of the tray 2, and a first hinge 8 and a second hinge 9. The first hinge 8 serves as an axis for the tray 2 during the pivoting operation, while the second hinge 9 fits into a corresponding guide groove 23 of the respective rotation cam 20 and serves as a type of lever for the pivoting operation.

For the uppermost tray 2, instead of a pair of guide rails 6 a single top guide rail 10 is used. The top guide rail 10 serves as a lid for the trays 2 and gives more stability to the pivoting mechanism. The top guide rail 10 also comprises guide grooves 7 and first hinges 8 and second hinges 9 as the guide rails 6 depicted in FIG. 3. In addition, the top guide rail 10 comprises a lock 11, whose function will be explained later.

FIG. 5 shows the drawer 12 for the disk changer 1 in more detail. Both sidewalls of the drawer 12 have five guide grooves 13, which form an extension of the guide grooves 7 of the guide rails 6 and the top guide rail 10, and which are used for guiding the trays 2 from the storage position to the operating position. Furthermore, both sidewalls of the drawer 12 comprise a hinge 14 for the rotation cams 20 and two guide bosses 16 for guiding the cam drivers 17. Finally, the bottom of the drawer 12 has a recess 15, whose function will also be explained later.

The pair of cam drivers 17 for the pivoting mechanism is depicted in FIG. 6. Each cam driver 17 has a pair of guide grooves 18 for accommodating the guide bosses 16 of the drawer 12. In addition, the tip of each cam driver 17 comprises a bearing 19, into which a hinge 22 of the corresponding rotation cam 20 is fit.

FIG. 7 shows the pair of rotation cams 20 for the pivoting mechanism. Both rotation cams 20 have a bearing 21, into which the hinge 14 of the drawer 12 is fit. The hinge 14 and the bearing 21 allow rotation of the rotation cams 20. In addition, both rotation cams 20 have a hinge 22, which is fit into the bearing 19 of the corresponding cam driver 17, and which serves as a lever for the rotation of the rotation cams 20. For the pivoting operation the rotation cams 20 comprise a plurality of curved guide grooves 23, into which the second hinges 9 of the guide rails 6 and the top guide rail 10 are fit. For the lowermost tray 2 no guide groove is needed, since it is sufficient to rotate the four upper trays 2 upwards while maintaining the lowermost tray 2 in its position. It is, of course, also possible to rotate the lowermost tray 2 upwards as well, or to rotate one or more of the lower trays 2 downwards (not shown here).

FIG. 8 shows the disk changer 1 according to the invention with pivoted trays 2, i.e. with the trays 2 being in the access position. In this position it is possible to access all trays 2 at the same time. For the pivoting operation the drawer 12 is moved forward while the cam drivers 17 are kept in their position. Since the rotation cams 20 are attached to the drawer 12 via the bearing 21 and the hinge 14 and to the cam drivers 17 via the further bearing 19 and the further hinge 22, the relative movement of the drawer 12 and the cam drivers 17 leads to a rotation of the rotation cams 20. At the same time, since the guide rails 6 and the top guide rail 10 are connected to the rotation cams 20 via the second hinges 9, and to the drawer 12 via the first hinges 8, the rotation of the rotation cams 20 leads to an upward rotation of the guide rails 6 and the top guide rail 10 and to a respective upward pivoting of the trays 2. For bringing the trays 2 back into the storage position, the pivoting operation is reversed, i.e. the drawer 12 is moved backward.

In FIG. 9 the disk changer 1 in its access position is shown. In the figure, the trays 2 have been loaded with optical recording media 24. When the user removes an optical recording medium 24 from one of the trays 2 and inserts a new one, it can occur that the inserted optical recording medium 24 slips into the disk changer 1 through the gap between the trays 2, as shown in FIG. 10. To prevent this, a disk stopper 25 is provided, which is depicted in FIG. 11. When the disk changer 1 is in the access position, the disk stopper 25 is locked by the lock 11 attached to the top guide rail 10. When the disk changer 1 is brought into the storage position, the lock 11 releases the disk stopper 25, which is then retracted into the recess 15 in the bottom of the drawer 12 to allow the trays 2 to be moved from the storage position to the operating position. The disk stopper 25 is secured in the extracted and the retracted position with a plate spring 26, as shown in the bottom view of the disk changer 1 depicted in FIG. 12. For this purpose the disk stopper has a cam close to its axis of rotation, which is pushed against the plate spring 26 and forces the plate spring into a strained position when the disk stopper 25 is rotated out of the retracted position or the extracted position. In this way a force is necessary to rotate the disk stopper 25 out of the retracted position or the extracted position. The disk changer 1 in the storage position with the disk stopper 25 being retracted is shown in FIG. 13.

Next, the operation of the disk stopper 25 shall be explained with reference to FIG. 14. The disk stopper 25 consists of a rotation bar 27 and a lever plate 30. The lever plate 30 comprises a recess, in which a cam 29 is fitted. The cam 29 is attached to a gear 28, which is used for moving the drawer 12 forwards or backwards. In this way no additional elements are necessary for the operation of the disk stopper 25. It is, of course, also possible to provide a separate driving mechanism for the disk stopper 25. As can be seen from FIGS. 14A to 14E, by rotating the gear 28 the rotation bar 27 is brought from a vertical (retracted) position to a horizontal (stopping) position through the joint operation of the lever plate 30 and the cam 29. By rotating the gear 28 in the opposite direction, the rotation bar 27 is brought from the horizontal position to the vertical position.

The invention claimed is:

1. Changer for optical recording media including a movable drawer supporting a number of trays arranged one above the other, each tray being capable of holding an optical recording medium, the trays being mounted such that they are pivotable about a horizontal axis, wherein the trays are pivoted about the horizontal axis by a rotating movement of a rotation cam connected to the drawer.

2. Changer according to claim 1, wherein the trays are mounted in guide rails mounted at a first end via a first hinge at the drawer and mounted via a second hinge at the rotation cam.

3. Changer according to claim 2, wherein the second hinge is located between the first hinge of the guide rail and the second end of the guide rail.

4. Changer according to claim 1, wherein the rotation cam is rotated by a cam driver connected to the rotation cam.

5. Changer according to claim 4, wherein the cam driver moves linearly relative to the drawer.

6. Changer according to claim 1, wherein a stopper is provided for preventing the slipping of an optical recording medium into the changer when the trays are pivoted.

7. Changer according to claim 6, wherein the stopper comprises a rotation bar rotatable from a retracted position to a stopping position and vice versa.

8. Changer according to claim 7, wherein a locking means is provided for securing the rotation bar in the stopping position and/or the retracted position.

9. Changer according to claim 7, wherein the rotation of the rotation bar from the retracted position to the stopping position and vice versa is controlled by a cam.

10. Changer according to claim 1, wherein the rotating movement of the rotation cam, the linear movement of the cam driver, and/or the rotation of the rotation bar are implemented by electro-mechanical driving means.

11. Changer according to claim 1, wherein the trays are provided with means for securing the optical recording media in the trays and in that the changer is arranged vertically.

12. Apparatus for reading from and/or writing to optical recording media wherein it comprises a changer for optical recording media according to claim 1.

* * * * *